US010156927B2

United States Patent
Misawa (10) Patent No.: US 10,156,927 B2
(45) Date of Patent: Dec. 18, 2018

(54) OPERATION DETECTING DEVICE FOR DETECTING THE PRESENCE OF A FOREIGN OBJECT ON AN OPERATION SURFACE

(71) Applicant: KABUSHIKI KAISHA TOKAI RIKA DENKI SEISAKUSHO, Aichi (JP)

(72) Inventor: Hiroshi Misawa, Aichi (JP)

(73) Assignee: KABUSHIKI KAISHA TOKAI RIKA DENKI SEISAKUSHO, Aichi (JP)

(*) Notice: Subject to any disclaimer, the term of this patent is extended or adjusted under 35 U.S.C. 154(b) by 114 days.

(21) Appl. No.: 15/091,844

(22) Filed: Apr. 6, 2016

(65) Prior Publication Data

US 2016/0306490 A1 Oct. 20, 2016

(30) Foreign Application Priority Data

Apr. 16, 2015 (JP) .................. 2015-084056

(51) Int. Cl.
*G06F 3/041* (2006.01)
*G06F 1/32* (2006.01)
(Continued)

(52) U.S. Cl.
CPC ............ *G06F 3/0416* (2013.01); *B60K 35/00* (2013.01); *B60K 37/06* (2013.01); *G06F 1/3215* (2013.01);
(Continued)

(58) Field of Classification Search
CPC ...... G06F 3/044; G06F 3/0416; G06F 3/0418; H03K 2217/960705
(Continued)

(56) References Cited

U.S. PATENT DOCUMENTS 8,976,153 B2 3/2015 Toda et al.
2009/0273579 A1* 11/2009 Zachut .................... G06F 3/044
345/174
(Continued)

FOREIGN PATENT DOCUMENTS

CN 102981685 3/2013
CN 103677394 A 3/2014
(Continued)

OTHER PUBLICATIONS

Office Action issued in a corresponding Japanese Patent Application No. 2015-084056 dated Feb. 28, 2017.
(Continued)

*Primary Examiner* — Yuzhen Shen
(74) *Attorney, Agent, or Firm* — Roberts Mlotkowski Safran Cole & Calderon, P.C.

(57) ABSTRACT

An operation detecting device includes a rescan unit that sets and rescans a rescan region on an operation surface when a difference between a detection value obtained by scanning the operation surface and a predetermined reference value has a peak value with one of positive and negative signs and an absolute value thereof is greater than an absolute value of a predetermined first threshold, the rescan region being set to include the detection point of the peak value with the one sign, and a determination unit determining that a conductive foreign object is attached to the operation surface when a difference between a detection value obtained by rescanning the rescan region and the predetermined reference value has a peak value with another sign and an absolute value thereof is greater than an absolute value of a predetermined second threshold.

4 Claims, 4 Drawing Sheets

(51) Int. Cl.
    *G06F 3/044*     (2006.01)
    *B60K 35/00*     (2006.01)
    *B60K 37/06*     (2006.01)

(52) U.S. Cl.
    CPC ............ *G06F 1/3262* (2013.01); *G06F 3/044* (2013.01); *G06F 3/0418* (2013.01); *B60K 2350/1024* (2013.01)

(58) Field of Classification Search
    USPC ......................................................... 345/173
    See application file for complete search history.

(56) References Cited

U.S. PATENT DOCUMENTS

| | | | |
|---|---|---|---|
| 2011/0157068 A1 | 6/2011 | Parker et al. | |
| 2012/0050214 A1* | 3/2012 | Kremin | G06F 3/0418 345/174 |
| 2012/0154324 A1 | 6/2012 | Wright et al. | |
| 2013/0057507 A1* | 3/2013 | Shin | G06F 3/044 345/174 |
| 2013/0215049 A1 | 8/2013 | Lee | |
| 2014/0062949 A1* | 3/2014 | Chang | G06F 3/044 345/174 |
| 2014/0204058 A1 | 7/2014 | Huang et al. | |
| 2015/0185919 A1* | 7/2015 | Chang | G06F 3/0418 345/174 |
| 2016/0170526 A1* | 6/2016 | Lee | G06F 3/044 345/174 |

FOREIGN PATENT DOCUMENTS

| | | |
|---|---|---|
| EP | 2801892 A2 | 11/2014 |
| JP | 2011-242908 A | 12/2011 |
| JP | 2012-88899 A | 5/2012 |
| JP | 2013-168121 A | 8/2013 |
| JP | 2014-219925 A | 11/2014 |

OTHER PUBLICATIONS

Extended European Search Report for European Patent Application No. 16165343.1 dated Aug. 24, 2016.

Chinese Office Action dated May 30, 2018 issued in related Chinese Application No. 201610186590.0, 21 pages.

* cited by examiner

OPERATION DETECTING DEVICE FOR DETECTING THE PRESENCE OF A FOREIGN OBJECT ON AN OPERATION SURFACE

The present application is based on Japanese patent application No. 2015-084056 filed on Apr. 16, 2015, the entire contents of which are incorporated herein by reference.

BACKGROUND OF THE INVENTION

1. Field of the Invention

The invention relates to an operation detecting device.

2. Description of the Related Art

A touch panel device is known which is provided with a mutual capacitance touch panel having plural transmission-side electrodes and reception-side electrodes, a detection unit for detecting tactile contact to the capacitive touch panel and outputting tactile contact information, a detection signal variation amount calculation unit for calculating the detection signal variation amounts of each of the plurality of transmission-side electrodes and reception-side electrodes on the basis of the tactile contact information and outputting the detection signal variation amounts, a variation amount distribution calculation unit for calculating the variation amount distribution of the detection signals on the basis of the detection signal variation amounts and outputting the variation amount distribution, and an assessment unit for assessing that a tactile contact to the capacitive touch panel is a water droplet if the peak value of the variation amount distribution of the detection signals is at or below a predetermined negative threshold (see e.g. JP-A-2012-88899).

The touch panel device is capable of detecting whether the tactile contact to the capacitive touch panel is a finger or a water droplet attached to the panel.

SUMMARY OF THE INVENTION

The touch panel device may have an increased manufacturing cost and a calculation processing overload due to the detection of the water droplet. This is because it calculates the detection signal variation amounts of at least each of three-dimensional intersections between the transmission-side electrodes and the reception-side electrodes to produce variation amount distribution and thus requires a large storage capacity to store the variation amount distribution based on the detection signal variation amounts of at least all three-dimensional intersections.

It is an object of the invention to provide an operation detecting device that prevents the increased manufacturing cost as well as the calculation processing overload upon detecting a conductive foreign object.

According to an embodiment of the invention, an operation detecting device comprises:

a rescan unit that sets and rescans a rescan region on an operation surface when a difference between a detection value obtained by scanning the operation surface and a predetermined reference value has a peak value with one of positive and negative signs and an absolute value thereof is greater than an absolute value of a predetermined first threshold, the rescan region being set to include the detection point of the peak value with the one sign; and a determination unit determining that a conductive foreign object is attached to the operation surface when a difference between a detection value obtained by rescanning the rescan region and the predetermined reference value has a peak value with another sign and an absolute value thereof is greater than an absolute value of a predetermined second threshold.

According to an embodiment of the invention, an operation detecting device can be provided that prevents the increased manufacturing cost as well as the calculation processing overload upon detecting a conductive foreign object.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Summary of the Embodiments

An operation detecting device in an embodiment is provided with a rescan unit that sets and rescans a rescan region on an operation surface when a difference between a detection value obtained by scanning the operation surface and a predetermined reference value has a peak value with one of positive and negative signs and an absolute value thereof is greater than an absolute value of a predetermined first threshold, the rescan region being set to include the detection point of the peak value on the one sign; and a determination unit determining that a conductive foreign object is attached to the operation surface when a difference between a detection value obtained by rescanning the rescan region and the predetermined reference value has a peak value with another sign and an absolute value thereof is greater than an absolute value of a predetermined second threshold.

This operation detecting device, when determining whether or not a conductive foreign object is attached, narrows a scan range to a region potentially having a conductive foreign object attached. Therefore, the number of detection values to be stored and processing load for detecting the conductive foreign object is less than when scanning the entire operation surface. In addition, since narrowing the scan range down to a region potentially having a conductive foreign object attached reduces the number of detection values to be stored, the operation detecting device can use a small capacity memory and the manufacturing cost is thereby reduced.

Embodiment

Configuration of Operation Detecting Device 1

Figure 1A:
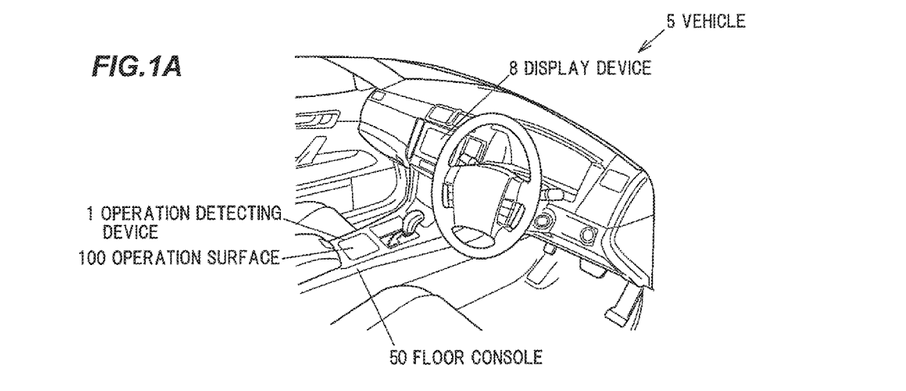
FIG. 1A is a schematic view showing an example of the inside of a vehicle mounting an operation detecting device in an embodiment.
Figure 1B:
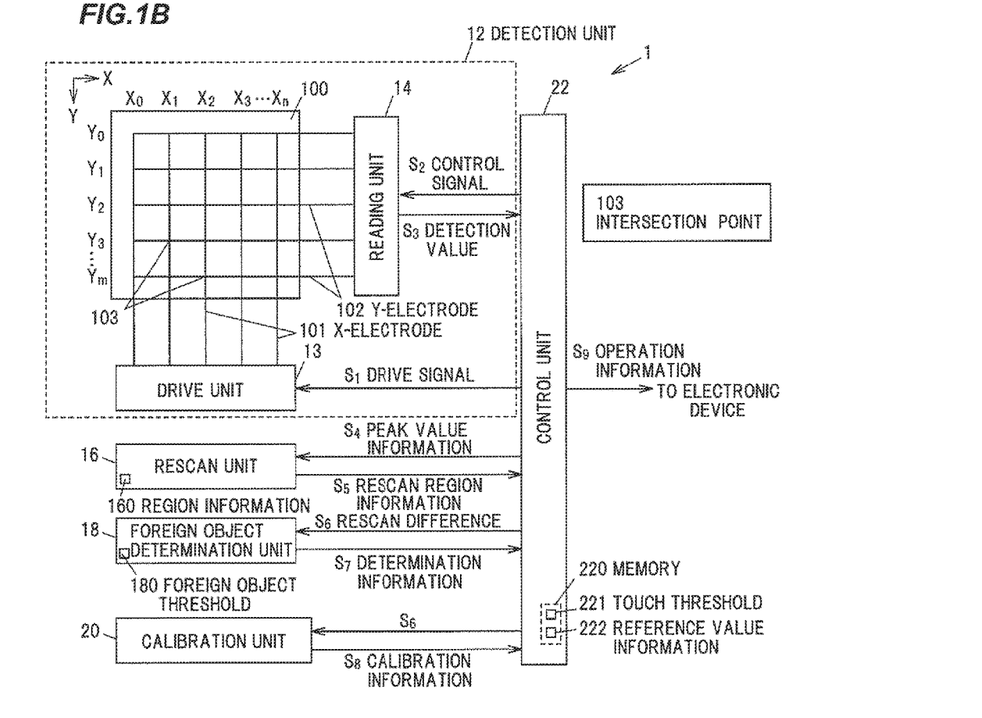
FIG. 1B is a block diagram showing an example of the operation detecting device.

FIG. 1A is a schematic view showing an example of the inside of a vehicle mounting an operation detecting device in an embodiment and FIG. 1B is a block diagram showing an example of the operation detecting device.

It should be noted that, a scale ratio in each drawing of the embodiment may be different from the actual scale ratio. In addition, flows of main signals and information are indicated by arrows in FIG. 1B.

The operation detecting device 1 is arranged on, e.g., a floor console 50 located between a driver's seat and a front passenger seat of a vehicle 5, as shown in FIG. 1A. A surface exposed from the floor console 50 is an operation surface 100 of the operation detecting device 1. The position to arrange the operation detecting device 1, however, is not limited to the floor console 50.

The operation detecting device 1 is configured to be, e.g., electromagnetically connected to an electronic device mounted on the vehicle 5 to operate the electronic device. The operation detecting device 1 is, e.g., a capacitive touchpad operated by a conductive pen or a finger to move or select a cursor displayed on the electronic device or to give instructions such as selecting, assigning, dragging or dropping the displayed icon.

The electronic device is, e.g., a navigation system, an air conditioner, a music playback device or a video playback device, etc. A display device 8 of the vehicle 5 functions as a display portion of the electronic device.

As shown in FIG. 1B, the operation detecting device 1 is mainly provided with a rescan unit 16 and a foreign object determination unit 18. The rescan unit 16 sets and rescans a rescan region (described later) on the operation surface 100 when a difference between a detection value $S_3$ obtained by scanning the operation surface 100 and a predetermined reference value has a peak value with one of positive and negative signs and an absolute value thereof is greater than an absolute value of a predetermined first threshold (touch threshold 221). The rescan region is set to include the detection point of the peak value on the one sign. The foreign object determination unit 18 as a determination unit determines that a conductive foreign object is attached to the operation surface 100 when a difference between a detection value obtained by rescanning the rescan region and the predetermined reference value has a peak value on another sign and an absolute value thereof is greater than an absolute value of a predetermined second threshold (foreign object threshold 180).

The predetermined reference value is a detection value obtained when, e.g., an object having conductivity is not in contact with or close to the operation surface 100. This detection value is, e.g., zero. Therefore, in the present embodiment, a difference between the read detection value and the predetermined reference value is equal to the detection value.

The peak value can be positive or negative. Thus, if the sign of the peak value is unknown, an absolute value of the peak value is compared to an absolute value of the threshold. In this regard, the detection value is a value with one of positive and negative signs when the operation surface 100 is touched by a finger of an operator. In the present embodiment, the one sign is defined as the positive (plus) sign and the other sign is defined as the negative (minus) sign. Therefore, the touch threshold 221 is a positive threshold and the foreign object threshold 180 is a negative threshold.

In addition to the configuration described above, the operation detecting device 1 in the present embodiment is also provided with a detection unit 12, a calibration unit 20 and a control unit 22 (described later) as a comparison unit, as shown in FIG. 1B.

Configuration of the Detection Unit 12

The detection unit 12 scans plural X-electrodes 101 as first electrodes placed along a first direction (Y-axis direction) and plural Y-electrodes 102 as second electrodes placed along a second direction (X-axis direction) intersecting with the first direction, which are arranged so as to be insulated from each other under the operation surface 100 to be operated. Then, the detection unit 12 outputs the detection values $S_3$ obtained at all intersection points 103 at which the first electrodes three-dimensionally intersects with the second electrodes.

The detection unit 12 is generally composed of a drive unit 13 and a reading unit 14, as shown in FIG. 1B. The drive unit 13 and the reading unit 14 are electrically connected to the control unit 22.

An XY coordinate system is defined on the operation surface 100, with, e.g., an origin at a top left, an X-axis in a horizontal direction and a Y-axis in a vertical direction, as shown in FIG. 1B. The operation surface 100 is a surface of an operation panel 10 (described later).

A number, n, of the X-electrodes 101 are arranged at equal intervals along a direction orthogonal to the X-axis. The "n" is, e.g., a positive integer. The n X-electrodes 101 are electrically connected to, e.g., the drive unit 13.

A number, m, of the Y-electrodes 102 are arranged at equal intervals along a direction orthogonal to the Y-axis. The "m" is, e.g., a positive integer. The m Y-electrodes 102 are electrically connected to, e.g., the reading unit 14. The "n" and "m" are, but not limited to, e.g., thirty in the present embodiment. Thus, thirty each of the X-electrode 101 and Y-electrode 102 are arranged.

Hereinafter, X-coordinates are denoted by X with a subscript number (from 0 to 29), i.e., $X_0$ to $X_{29}$ from left to right. Meanwhile, Y-coordinates are denoted by Y with a subscript number (from 0 to 29), i.e., $Y_0$ to $Y_{29}$ from top to bottom.

The drive unit 13 is driven by a drive signal $S_1$ output from the control unit 22. The drive unit 13 supplies the drive signal $S_1$ to the X-electrodes 101 subsequently from $X_0$ to $X_{29}$.

Meanwhile, when the X-electrode 101 on $X_i$ (where i is an integer between 0 and 29) is driven, the reading unit 14 is connected to the Y-electrodes 102 sequentially from $Y_0$ to $Y_{29}$, and then outputs the detection values $S_3$. The detection value $S_3$ is capacitance at each intersection point 103.

The reading unit 14 is also configured to switch connection to a specified Y-electrode 102 based on a control signal $S_2$ to read each detection value $S_3$.

Configuration of the Rescan Unit 16

Figure 2A:
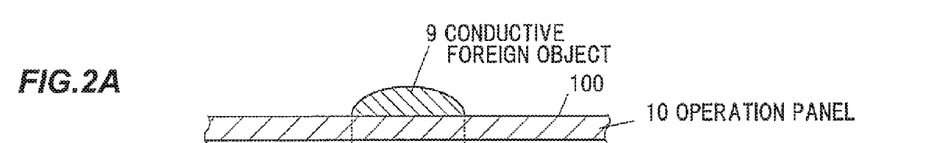
FIG. 2A is an illustration diagram showing an example of a conductive foreign object attached to an operation surface of the operation detecting device in the embodiment.
Figure 2B:
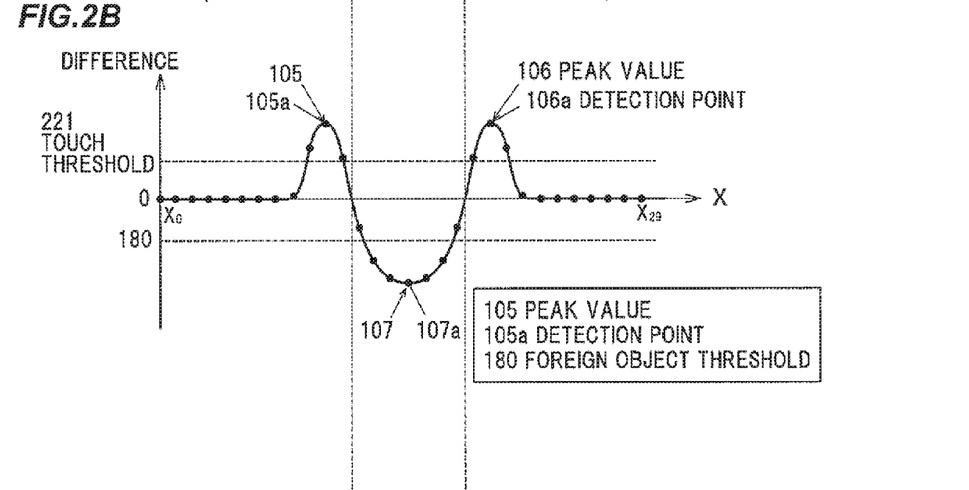
FIG. 2B is a graph showing an example of detection values read from an Y electrode on a coordinate $Y_j$ and showing a difference caused by the attached conductive foreign object.
Figure 2C:
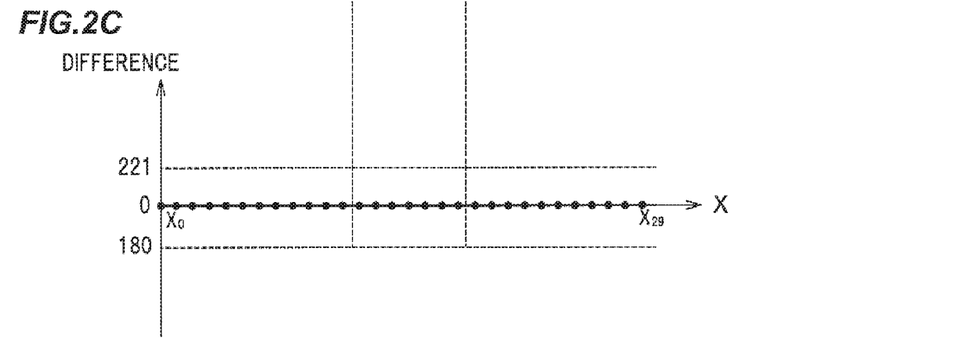
FIG. 2C is a graph showing an example of a difference after calibration based on the conductive foreign object.
Figure 3A:
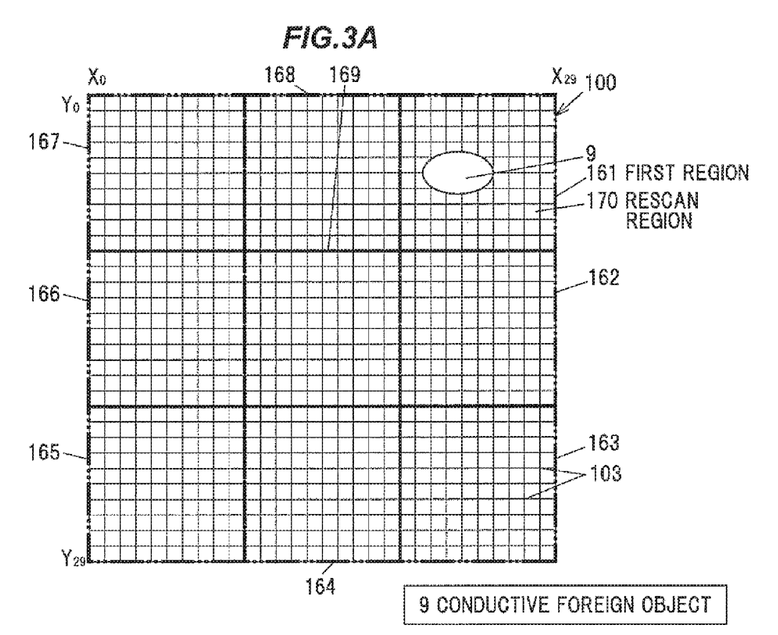
FIG. 3A is an illustration diagram showing an example of rescan region setting of the operation detecting device in the embodiment.
Figure 3B:
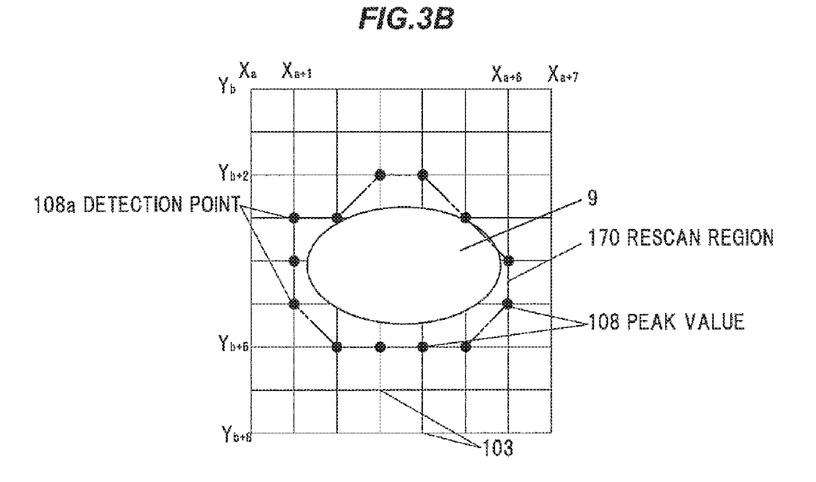
FIG. 3B is an illustration diagram showing an example modification of the rescan region setting.

FIG. 2A is an illustration diagram showing an example of a conductive foreign object attached to an operation surface of the operation detecting device in the embodiment, FIG. 2B is a graph showing an example of detection values read from an Y electrode on a coordinate $Y_j$ and showing a difference caused by the attached conductive foreign object and FIG. 2C is a graph showing an example of a difference after calibration based on the conductive foreign object. FIG. 3A is an illustration diagram showing an example of the rescan region setting of the operation detecting device in the embodiment, and FIG. 3B is an illustration diagram showing an example modification of the rescan region setting. FIGS. 2B and 2C show a difference, e.g., variation, in the value of the Y-electrode 102 on the coordinates ($Y_j$, $X_0$ to $X_{29}$). In FIGS. 2B and 2C, the vertical axis indicates a difference and the horizontal axis indicates the X-coordinate. The "j" here is an integer of not less than 0 and not more than 29.

As shown in FIGS. 2A and 2B, when a conductive foreign object 9 is attached to the operation surface 100 which is a surface of the operation panel 10, the difference has a component with one sign (positive sign) and a component on the other sign (negative sign). In the present embodiment, since the difference is positive when an operating finger touches the operation surface 100 as described above, the touch threshold 221 is preliminary set to a positive value in the control unit 22, as shown in FIG. 2B. Meanwhile, the foreign object threshold 180 for determining the presence of the conductive foreign object 9 is preliminary set to a negative value in the foreign object determination unit 18.

Black dots shown in FIGS. 2B and 2C indicate the differences at the intersection points 103 between the Y-electrode 102 on $Y_j$ and the X-electrodes 101 on $X_0$ to $X_{29}$. In FIG. 2B, since a peak value 105 at a detection point 105a and a peak value 106 at a detection point 106a are positive peak values and both are greater than the touch threshold 221, the control unit 22 determines that an operating finger is in contact with the operation surface 100, as described later.

Meanwhile, since a peak value 107 at a detection point 107a is a negative peak value and is smaller than the foreign object threshold 180, the determination unit 18 determined that the conductive foreign object 9 is attached to the operation surface 100, as described later.

Such a presence of the conductive foreign object 9 can be determined based on positive and negative peak values using pre-produced difference distribution but, in such a case, it is necessary to calculate differences at least at nine hundred intersection points 103 and also necessary to store distribution of the differences. In view of the cost, conductive foreign object detection is preferably performed with less processing load and using less memory. The conductive foreign object detection in the present embodiment can be performed with less processing load and using less memory by reducing the number of the intersection points 103 subjected to calculation of a difference.

Then, when a peak value greater than the touch threshold 221 is present, the rescan unit 16 sets a rescan region 170 as a region to be rescanned, based on the detection point corresponding to such a peak value.

In detail, when it is determined that a peak value greater than the touch threshold 221 is present, the rescan unit 16 sets the rescan region 170 which includes the detection point of such a peak value and is smaller than the entire operation surface 100. Thus, frequency of calculating the differences, etc., is reduced.

The rescan unit 16 in the present embodiment divides the operation surface 100 into nine regions, first to ninth regions 161 to 169, as indicated by dash-dot-dot lines in FIG. 3A, determines that a region including a peak value greater than the touch threshold 221 belongs to which of the first to ninth regions 161 to 169, and sets the determined region as the rescan region 170.

The first to ninth regions 161 to 169 are defined such that the first to eighth 161 to 168 are arranged clockwise as viewed in the plane of FIG. 3A and the ninth region 169 is the center region.

The rescan unit 16 has region information 160 as information about the first to ninth regions 161 to 169 which are the nine divided regions of the operation surface 100.

When peak values greater than the touch threshold 221 are present in plural regions, the rescan unit 16 sets the plural regions as the rescan region 170. When, for example, a positive peak value is present across the first and second regions 161 and 162, the rescan unit 16 sets the first and second regions 161 and 162 as the rescan region 170. Meanwhile, when peak values are present in plural regions which are not adjacent to each other, the rescan unit 16 sets the plural regions with the peak values as the rescan region 170.

The rescan unit 16 sets the rescan region 170 based on, e.g., the region information 160 and peak value information $S_4$ output from the control unit 22 because of the presence of peak value(s) greater than the touch threshold 221, and outputs rescan region information $S_5$ as information about the rescan region 170 to the control unit 22. The control unit 22 controls the drive unit 13 and the reading unit 14 based on the acquired rescan region information $S_5$ so that the rescan region 170 is scanned.

Modification

Now, a modification of the rescan region 170 will described. A region in a range of $X_a$ to $X_{a+7}$ and $Y_b$ to $Y_{b+8}$ is shown in FIG. 3B. The "a" is an integer of not less than 0 and not more than 22 when thirty X-electrodes 101 are provided, and the "b" is an integer of not less than 0 and not more than 21 when thirty Y-electrodes 102 are provided.

The rescan region 170 set by the rescan unit 16 in the modification is a region defined by plural detection points of the peak values on the one side of 0.

As shown in FIG. 3B, plural peak values 108 on the one side of 0, i.e., the positive peak values, are present around the conductive foreign object 9, as described above. The rescan unit 16 outputs the rescan region information $S_5$ in which a region surrounded by a line connecting detection points 108a of the plural peak values 108, i.e., surrounded by a dash-dot-dot line in FIG. 3B, is defined as the rescan region 170.

Alternatively, as another modification, the rescan unit 16 may be configured such that a minimum rectangular region including detection points of plural positive peak values is defined as the rescan region 170. In such a case, the rescan region 170 in FIG. 3B is a rectangular region with vertices at, e.g., the intersection points $(X_{a+1}, Y_{b+2})$, $(X_{a+6}, Y_{b+2})$, $(X_{a+1}, Y_{b+6})$ and $(X_{a+6}, Y_{b+6})$.

Configuration of the Foreign Object Determination Unit 18

The foreign object determination unit 18 has the foreign object threshold 180. The foreign object determination unit 18 acquires a rescan difference $S_6$ obtained as a result of rescanning of the rescan region 170 by the detection unit 12 and determines the presence of a conductive foreign object based on comparison of the rescan difference $S_6$ with the foreign object threshold 180. When the reference value is zero, the rescan difference $S_6$ is the same value as the detection value $S_3$ at the corresponding intersection point 103.

When the peak value 107 on the negative side is smaller than the foreign object threshold 180 as shown in FIG. 2B, the foreign object determination unit 18 determines that the conductive foreign object 9 is attached to the operation surface 100. The foreign object determination unit 18 generates determination information $S_7$ indicating the determined result and outputs the determination information $S_7$ to the control unit 22.

Configuration of the Calibration Unit 20

When it is determined that a conductive foreign object is attached, the calibration unit 20 calibrates the rescan region 170 or the entire operation surface 100. The calibration of the entire operation surface 100 may be performed when, e.g., determination of the presence of the conductive foreign object is made, or may be performed when the conductive foreign object is attached across more than one of the first to ninth regions 161 to 169. In the present embodiment, as an example, when a conductive foreign object is attached to one of the first to ninth regions 161 to 169, this single region is set as the rescan region 170 and is calibrated. Meanwhile, when a conductive foreign object is attached across plural regions and the rescan region 170 thus includes the plural regions, the entire operation surface 100 is calibrated.

The calibration means that, e.g., differences at the intersection points 103 having a value other than 0 are adjusted to zero, as shown in FIGS. 2B and 2C. The calibration unit 20 generates calibration information $S_8$ including coordinate information of the intersection points 103 with the difference adjusted to zero, and outputs the calibration information $S_8$ to the control unit 22.

Configuration of the Control Unit 22

The control unit 22 is configured to perform comparison of whether or not an absolute value of a peak value of a difference between the detection value $S_3$ obtained by scanning the operation surface 100 and the predetermined reference value, when having the peak value on the one side of 0, is greater than an absolute value of the predetermined first threshold.

The control unit 22 is, e.g., a microcomputer composed of a CPU (Central Processing Unit) performing calculation and processing, etc., of the acquired data according to a stored program and a memory 220 as a semiconductor memory, etc. The memory 220 stores, e.g., a program for operation of the control unit 22, the touch threshold 221, and reference value information 222. The memory 220 is also used as a storage area for, e.g., temporarily storing calculation results, etc. The control unit 22 also has a clock signal generating means therein and is operated based on clock signals.

The control unit 22 controls the detection unit 12, compares the detection value $S_3$ acquired from the detection unit 12 with the touch threshold 221, and determines, when a peak value greater than the touch threshold 221 is present, that an operation is performed.

The reference value information 222 is information of the predetermined reference value of the difference associated with the intersection points 103. Before calibration due to the attached conductive foreign object is performed, the reference value is, e.g., zero. After the calibration, a reference value is set for each intersection point 103 in the rescan region 170 so that the rescan difference $S_6$ obtained by rescanning the rescan region 170 is zero. The reference value for the other intersection points 103 is the same as that before the calibration.

Changing the reference value as such allows the control unit 22 to detect an operation performed in a state that an operator is in contact with the conductive foreign object.

Based on the rescan region information $S_5$ acquired from the rescan unit 16, the control unit 22 supplies the drive signal $S_1$ to the X-electrodes 101 selected to be driven and also controls the reading unit 14 to select the Y-electrodes 102 in the rescan region 170 and to read and output the detection values $S_3$ thereof.

The control unit 22 generates operation information $S_9$ including information of coordinates of detection points at which an operation is detected, and then outputs the operation information $S_9$ to a connected electronic device.

Figure 4:
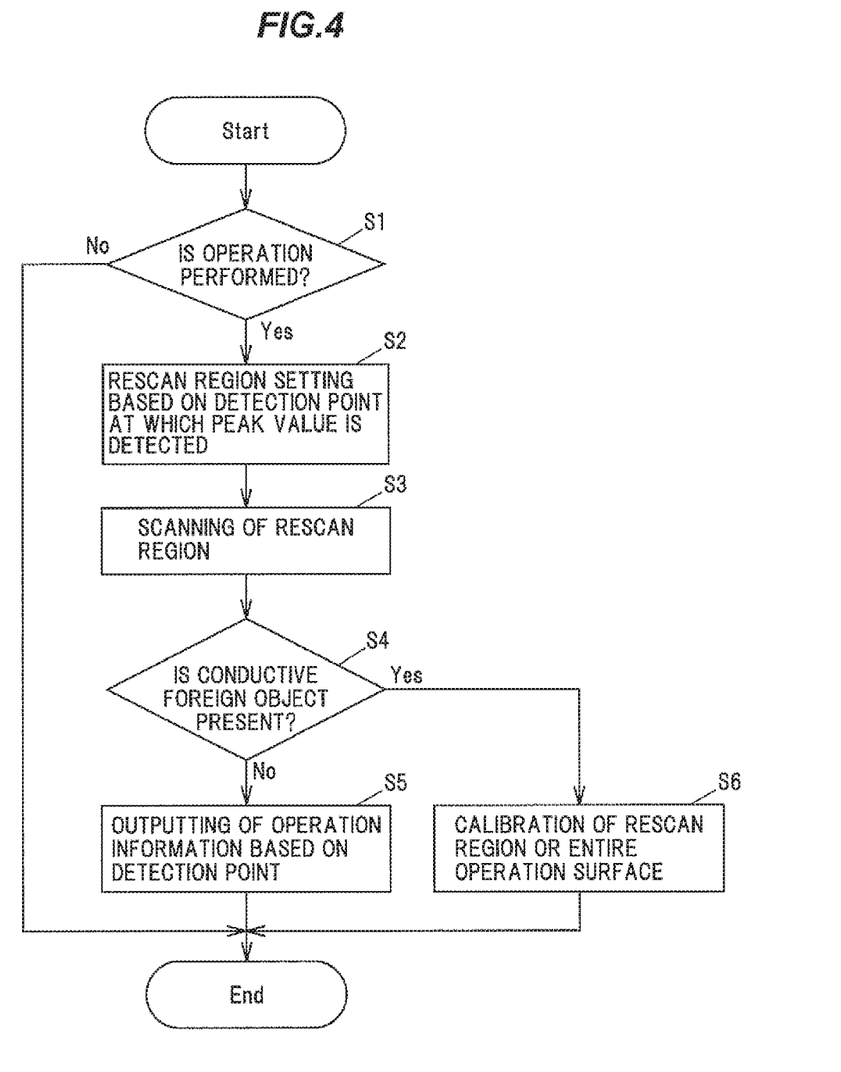
FIG. 4 is a flowchart showing an example of the conductive foreign object detection operation of the operation detecting device in the embodiment.

Next, an operation of the operation detecting device 1 in the present embodiment will be described below referring to the flowchart of FIG. 4.

Operation

When the vehicle 5 is powered on, the control unit 22 of the operation detecting device 1 outputs the drive signal $S_1$ and the control signal $S_2$ to the drive unit 13 and the reading unit 14 of the detection unit 12.

The control unit 22, which acquired the detection value $S_3$ from the reading unit 14, calculates a difference between the reference value in the reference value information 222 and the detection value $S_3$ and compares the difference with the touch threshold 221.

When a peak value greater than the touch threshold 221 is present, the control unit 22 determines that an operation is performed (S1: Yes). Subsequently, the control unit 22 outputs the peak value information $S_4$ as information of the peak value to the rescan unit 16.

The rescan unit 16 confirms a detection point of the peak value based on the acquired peak value information $S_4$. Then, the rescan unit 16 sets the rescan region 170 based on the detection point at which the peak value is obtained (S2). Following this, the rescan unit 16 generates the rescan region information $S_5$ based on the rescan region 170 and outputs the rescan region information $S_5$ to the control unit 22.

The control unit 22 generates the drive signal $S_1$ and the control signal $S_2$ based on the acquired rescan region information $S_5$ and outputs the drive signal $S_1$ and the control signal $S_2$ to the drive unit 13 and the reading unit 14 to scan the rescan region 170 (S3). Next, the control unit 22 calculates a difference based on the detection value $S_3$ output as a result of the scanning, and generates and outputs the rescan difference $S_6$ to the foreign object determination unit 18.

The foreign object determination unit 18, which acquired the rescan difference $S_6$, compares the rescan difference $S_6$ with the foreign object threshold 180. Then, when a peak value smaller than the foreign object threshold 180 is not present as a result of comparison, the foreign object determination unit 18 determines that the conductive foreign object is not attached (S4: No), and then outputs the determination information $S_7$ based on the determination result to the control unit 22.

The control unit 22, which determines based on the determination information $S_7$ that the conductive foreign object is not attached, calculates the coordinates of the operating point on the operation surface 100 based on the detection point, outputs the calculated coordinates as the operation information $S_9$ to the connected electronic device (S5) and terminates the operation of detecting the conductive foreign object. Although this detecting operation is performed each time the vehicle 5 is powered on, it is not limited thereto. For example, the detecting operation may be performed periodically.

When the peak value greater than the touch threshold 221 is not present in Step 1 (S1: No), the control unit 22 terminates the operation of detecting the conductive foreign object.

When it is determined in Step 4 that the conductive foreign object is attached to the operation surface 100 (S4: Yes), the foreign object determination unit 18 outputs the determination information $S_7$ based on the determination result to the control unit 22. The control unit 22 outputs the rescan difference $S_6$ of the rescan region 170 to the calibration unit 20 based on the determination that the conductive foreign object is attached. The calibration unit 20 calibrates the rescan region 170 or the entire operation surface 100 based on the acquired rescan difference $S_6$ (S6) and outputs the calibration information $S_8$ to the control unit 22. The control unit 22 updates the reference value information 222 based on the calibration information $S_8$.

The operation detecting device 1 may be configured to begin the operation of detecting the conductive foreign object when affected by electromagnetic noise or in case of failure operation detection.

Effects of the Embodiment

The operation detecting device 1 in the present embodiment can detect a conductive foreign object with less processing load and allows the manufacturing cost to be reduced. In detail, the operation detecting device 1, when determining whether or not a conductive foreign object is attached, narrows a scan range to the rescan region 170 potentially having a conductive foreign object attached. Therefore, the number of the detection values $S_3$ to be stored and processing load for detecting the conductive foreign object is less and the processing speed is faster than when scanning the entire operation surface 100. In addition, since narrowing the scan range down to the rescan region 170 reduces the number of the detection values $S_3$ to be stored, the operation detecting device 1 can use the memory 220 with a small capacity and the manufacturing cost is thereby reduced.

The operation detecting device 1 is capable of completing the process from the beginning of determination of the conductive foreign object to the end of calibration in a shorter time than when scanning the entire operation surface 100. In addition, since the operation detecting device 1 completes the process from the detection of the conductive foreign object to the end of calibration in a short time, waiting time is small and operability is thus improved.

The operation detecting device 1 can reduce time to the end of calibration when restarted due to an effect of electromagnetic noise, etc.

Alternatively, as an another embodiment, the operation detecting device 1 may be provided with a detection unit for scanning a plurality of first electrodes placed along a first direction and a plurality of second electrodes placed along a second direction intersecting with the first direction, the first and second electrodes being arranged so as to be insulated from each other under an operation surface to be operated, and outputting detection values obtained at all intersection points at which the first electrodes three-dimensionally intersects with the second electrodes, a comparison unit for performing comparison of whether or not an absolute value of a peak value of a difference between the detection value obtained by scanning the operation surface and the predetermined reference value, when having the peak value with the one sign, is greater than an absolute value of a predetermined first threshold, a rescan unit that sets and rescans a rescan region on an operation surface when the absolute value of the peak value with the one sign is greater than the first threshold based on the comparison result from the comparison unit, the rescan region being set to include the detection point of the peak value with the one sign and have fewer intersection points than all intersection points, and a determination unit determining that a conductive foreign object is attached to the operation surface when a difference between a detection value obtained by rescanning the rescan region and the predetermined reference value has a peak value on the other sign and an absolute value thereof is greater than an absolute value of a predetermined second threshold.

In the operation detecting device 1 of the embodiments and modifications, a portion thereof may be realized by, e.g., a computer executable program, ASIC (Application Specific Integrated Circuit) and FPGA (Field Programmable Gate Array), etc., according to the intended use.

Although some embodiments and modifications of the invention have been described above, the embodiments and modifications are merely an example and the invention according to claims is not to be limited thereto. These new embodiments and modifications may be implemented in various other forms, and various omissions, substitutions and changes, etc., can be made without departing from the gist of the invention. In addition, all combinations of the features described in the embodiments and modifications are not necessary to solve the problem of the invention. Further, these embodiments and modifications are included within the scope and gist of the invention and also within the invention described in the claims and the equivalency thereof.

What is claimed is:

1. An operation detecting device, comprising:
   a digital controller;
   a touch panel including a plurality of first electrodes placed along a first direction and a plurality of second electrodes placed along a second direction and intersecting at points with the plurality of first electrodes, the first and second electrodes being arranged so as to be insulated from each other under an operation surface, and intersection points between the first and second electrodes defining detection points;
   a rescan circuit electrically connected to the digital controller that selects a rescan region on the operation surface that is only a portion of the operation surface when a difference between a detection value associated with a detection point obtained by scanning the operation surface and a predetermined reference value has a peak value with one of positive and negative signs and an absolute value thereof is greater than an absolute value of a predetermined first threshold, the selected rescan region being no larger than a minimum rectangular region of the operation surface necessary to include a plurality of detection points of the peak values with the one sign, the rescan circuit rescanning the detection points within the rescan region, the selected rescan region including the detection point of the peak value with the one sign;
   a determination circuit electrically connected to the digital controller that determines whether a conductive foreign object is attached to the operation surface when a difference between a detection value obtained by rescanning the rescan region and the predetermined reference value has a peak value with another sign and an absolute value thereof is greater than an absolute value of a predetermined second threshold, and
   a calibration circuit electrically connected to the digital controller that, when it is determined that a conductive foreign object is attached, either calibrates the rescan region by adjusting the detection value of the detection points within the rescan region to zero while leaving unchanged the detection value of the detection points outside of the rescan region, or calibrates the entirety of the operation surface by adjusting the detection value of all of the detection points to zero.

2. The operation detecting device according to claim 1, wherein the minimum rectangular region has vertices corresponding to intersection points of the plurality of first electrodes placed along a first direction and the plurality of second electrodes placed along a second direction.

3. An operation detecting device, comprising:
   a digital controller;
   a touch panel including a plurality of first electrodes placed along a first direction and a plurality of second electrodes placed along a second direction intersecting with the first direction, the first and second electrodes being arranged so as to be insulated from each other under an operation surface;

a detection circuit electrically connected to the digital controller for scanning the plurality of first and second electrodes, and outputting detection values obtained at all points at which the first electrodes three-dimensionally intersect with the second electrodes, wherein the intersection points define detection points;

a comparison circuit electrically connected to the digital controller for performing comparison of whether or not an absolute value of a peak value of a difference between the detection values obtained by scanning the operation surface and a predetermined reference value, when having the peak value with the one sign, is greater than an absolute value of a predetermined first threshold;

a rescan circuit electrically connected to the digital controller that selects a rescan region on the operation surface that is only a portion of the operation surface when the absolute value of the peak value with the one sign is greater than the first threshold based on the comparison result from the comparison circuit, the selected rescan region being no larger than a minimum rectangular region of the operation surface necessary to include a plurality of detection points of the peak values with the one sign, the rescan region including the detection point of the peak value with the one sign and the rescan circuit rescanning the detection points within the rescan region;

a determination circuit electrically connected to the digital controller that determines whether a conductive foreign object is attached to the operation surface when a difference between a detection value obtained by rescanning the rescan region and the predetermined reference value has a peak value with the other sign and an absolute value thereof is greater than an absolute value of a predetermined second threshold, and a calibration circuit electrically connected to the digital controller that, when it is determined that a conductive foreign object is attached, either calibrates the rescan region by adjusting the detection value of the detection points within the rescan region to zero while leaving unchanged the detection value of the detection points outside of the rescan region, or calibrates the entirety of the operation surface by adjusting the detection value of all of the detection points to zero.

4. The operation detecting device according to claim 2, wherein the minimum rectangular region has vertices corresponding to intersection points of the plurality of first electrodes placed along a first direction and the plurality of second electrodes placed along a second direction.

* * * * *